Feb. 18, 1930. A. TRIPPE-FÜRST 1,747,404
ADVERTISING DEVICE
Filed Sept. 30, 1927 4 Sheets-Sheet 2
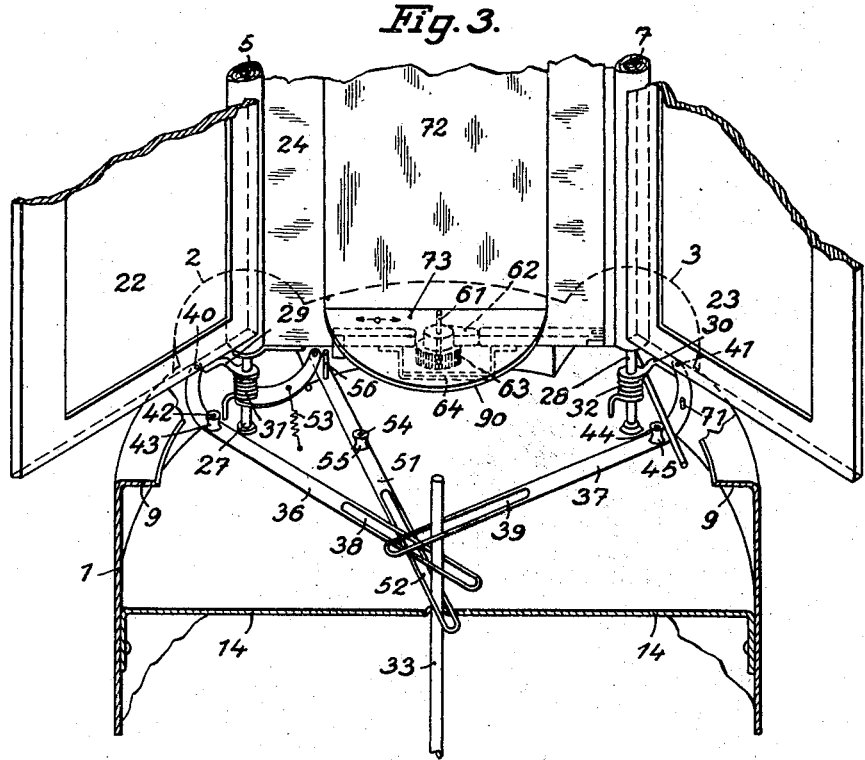
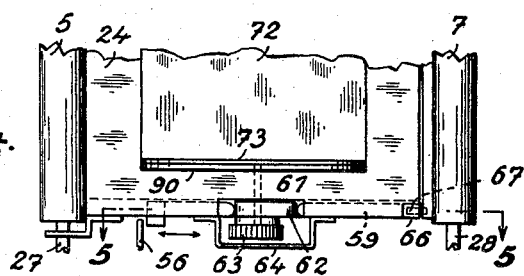

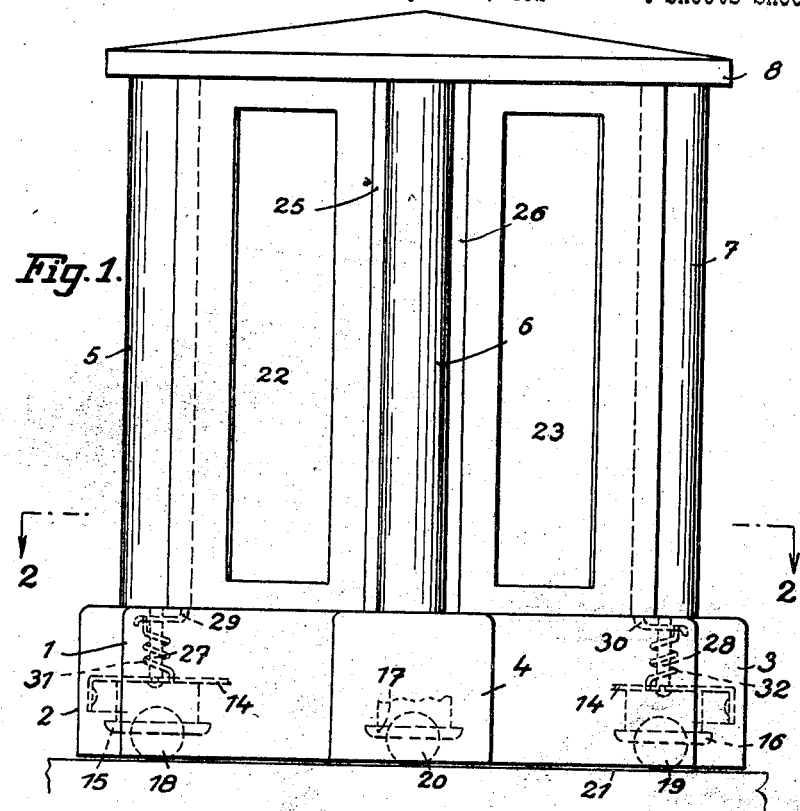
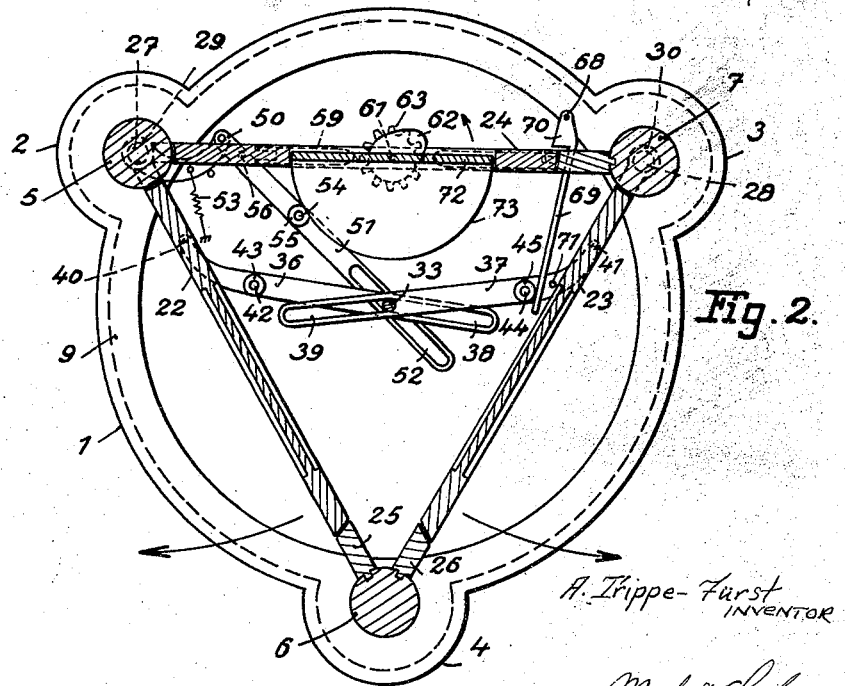

Feb. 18, 1930.  A. TRIPPE-FÜRST  1,747,404
ADVERTISING DEVICE
Filed Sept. 30, 1927    4 Sheets-Sheet 3

A. Trippe-Fürst
INVENTOR

By: Marks & Clerk
ATYS.

Feb. 18, 1930.   A. TRIPPE-FÜRST   1,747,404
ADVERTISING DEVICE
Filed Sept. 30, 1927   4 Sheets-Sheet 4

A. Trippe-Fürst
INVENTOR

By Marks & Clerk
Attys.

Patented Feb. 18, 1930

1,747,404

UNITED STATES PATENT OFFICE

ALEXANDER TRIPPE-FÜRST, OF BERLIN-REINICKENDORF, GERMANY, ASSIGNOR TO STEFAN MÜLLER, OF BERLIN, GERMANY

ADVERTISING DEVICE

Application filed September 30, 1927, Serial No. 223,203, and in Germany April 4, 1927.

This invention relates to an advertising apparatus and it consists in this that an advertising object, representation or the like is made visible in the interior of a space which is capable of being closed by at least one door when the door is once opened, whereupon the door is again closed and when it is opened again the advertised object has disappeared from the space. This is effected by arranging that when the door is closed, a portion of the rear wall of the said space facing away from the observer is turned round through an angle of 180° or is otherwise opened so that the advertised object, advertisement or the like which was present in the closed space can be removed, whereupon the part of the rear wall is closed again and when the door is opened again the observer can only see the empty space.

The form of construction according to the invention, the space in which the advertised object can alternately appear and disappear is arranged apparently unsupported; however the rear part is not visible to the observer, for instance by so arranging the advertising devices in a display window or otherwise in such a way that the observer cannot see completely behind the advertising devices.

In the form of construction according to the invention, the advertised object or the like is fixed preferably removably fixed with that part of the rear wall which is moved to the outside when the door is closed. The two sides of the said part of the background are made alike so that first of all the one side with the advertised object or the like and then the other empty side of the background can be seen by the observer each time the door is open.

If desired the surprise of the observer can be increased by some fixed parts of the background and the movable part being provided with inscriptions or other representations which merge into one another when the background in its turn is closed.

Of course the movable part of the background must be so inserted into the part which may be fixed that the division cannot be seen by the observer.

According to the form of construction of the invention the background itself is also moved together with the part which is always arranged to move for the purpose of causing the advertised object or the like to appear and disappear. In that case the advertising apparatus operates in such a manner that first one or more front doors are opened and with the background closed the advertised object or the like appears in the space whereupon the doors are again closed and then again opened when it is noticed that the space is empty; moreover the background is moved wholly or partly towards the back (seen from the position of the observer) and the observer can see completely through the empty space. He does not see in this case the advertised article either because while the doors are closed the same has been removed from the back, in a manner invisible to the observer who stands in the front, through the turned-over part of the background, or the advertised article is on the turned-over part of the background and remains invisible to the observer even from behind also when the background is being moved. If necessary the object is additionally covered by one of the front doors being turned to the back. Thereupon the background and the front door or doors are again closed, the background is partly opened or turned and the advertised object or the like is introduced into the space, the background being thereupon again closed and then the front door or doors opened. The surprised observer now sees again in the space the advertised article or a new advertised article or the like.

According to the form of construction of the invention the apparently unsupported space itself is made movable, being supported from below. This is what happens in this case:—In the position of rest of the closed space at least one door faces the observer, which door is alternately opened and closed. When the door is first opened an advertised article or the like is seen in the space. When the door is opened a second time it disappears in the same way as already described above, that is to say through a part of the background which is capable of being opened. Now if the article has been completely removed from the space by hand or in any other suitable way, the space can, after the front door and the background have been closed, be turned once or several times completely round its rotary axis or be otherwise moved so that the observer can see it from all sides and be under the impression that the space is completely closed; of course the background must be formed also on the outside in such a way that no joints etc. can be seen. However if the advertised object is secured to the movable part of the background the object is first of all introduced into the space in the manner already described above, whereupon the front door or doors is or are opened and the advertised object is thereby made visible to the observer, all the doors being then closed and the article being conveyed to the outside by the movable part of the background. Now the front doors are again opened and the observer sees the free space; the front doors now close again. The advertised article or the like which is on the background is now brought into the front and laterally closed space by the rotation of the background or of a portion of the same and thereupon the space which is closed on all sides is rotated around some axis or is otherwise moved. As soon as the free space which is closed on all sides has reached its starting position the operations above described are repeated.

In the drawings which illustrate the invention by way of example the space has been illustrated in the form of a Greek temple comprising a bottom plate and a ceiling carried by three symmetrical columns. The three side surfaces between the ceiling, bottom plate and each two columns are closable by means of seperate pivoted doors. This temple is mounted by means of rollers on a support and is capable of being rotated around its vertical axis of symmetry.

Figure 1 shows a front view of the temple with closed doors.

Figure 2 is a section along the line 2—2 of Figure 1, seen in the direction of the arrows indicated in Fig. 1, the covering floor of the bottom plate being removed.

Figure 3 is a perspective part view, upper and lower parts of the temple being broken off, and the front doors being opened, whilst the background is closed.

Figure 4 illustrates a detail of the lower part of the background in elevation and partly in section.

Figure 5 shows a section along the line 5—5 in Fig. 4 seen in the direction of the arrows indicated in the latter Figure.

Figure 6:
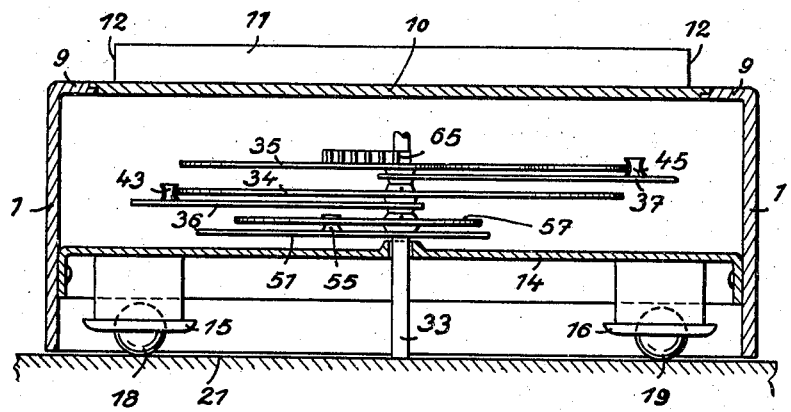
Figure 6 is a part sectional view through the bottom plate of the temple showing the noncircular driving discs and operating levers.

The bottom plate consists of a lateral frame 1 of circular shape (see Figs. 1, 2, 3 and 6) having three symmetrically arranged eye-like enlargements 2, 3, 4 which are so built that at the same time they form the enlarged feet of the three supporting columns 5, 6, 7 of the ceiling 8. The eye-shaped enlargements are also made hollow. The whole of the frame 1 together with the eyes 2, 3 and 4 is turned over at the top as shown at 9 merging into a covering plate 10 (Fig. 6) which is mounted after the insertion of all the driving parts; the joints must be made as invisible as possible. Over the covering plate 10 there may also be arranged a floor 11 (see Fig. 6), for a purpose which will be hereinafter more particularly described. The floor 11 is of triangular cross section so that it fits exactly in the closed space of the temple and that the doors which will hereinafter be more particularly referred to can abut against the lateral surfaces 12. The frame 1 is closed at its lower part by a plate 14 on which legs 15, 16, 17 are provided, in which rollers 18, 19, 20 are mounted by means of which the bottom plate is mounted on a support 21.

The side surfaces which are determined by the three columns 5, 6, 7, the bottom plate and the ceiling are closed by doors 22, 23 and 24. It is to be pointed out that two of these doors, viz, the door 24 which will constitute the background and the door 22 can be turned around the same column 5, these doors as well as the third door being capable of being pivoted to the outside.

The two doors 22 and 23 always face the observer when the temple is in its position of rest and they will hereinafter be referred to as the front doors while the third door is arranged at the back and will hereinafter be referred to as the back door or background. When the front doors 22 and 23 are closed the observer can never see what happens in the interior of the closed space and as regards the back door 24.

The doors 22 and 23 are thus rotatable around the geometric axis of the columns 5 and 7 respectively and do not close completely on to the column 6 at the front, but on to projections 25 and 26 respectively. It is assumed that the doors are made of wood and that they are provided with an outer frame which is recessed and which at the rear end of the door has arms at the top and bottom, engaging with a pin or pivot provided in the upper and lower end of the columns 5 and 7 and engaging at the one end into the ceiling 8 and at the other end into the bottom plate 14. The said pins or pivots are secured in the ceiling as well as in the bottom plate after complete assembling, in the ceiling for instance by means of a sunk-in screw head and in the bottom plate for instance by means of a rivet head. The lower pins or pivots have been shown at 27 and 28 in Figs. 1 and 2 together with the extensions 29 and 30 of the iron frame in dotted lines, whilst the upper connection has been left out for the sake of clearness.

Around the lower pins or pivots 27, 28 there are provided within the eyes 2 and 3 and thus invisible to the observer helical springs 31 and 32 in such a manner that the one end of the springs abuts against the arms 29 and 30 respectively, whilst the other end thereof is secured in a suitable manner to the bottom plate 14; the winding of the helical springs is such that the springs always tend to keep the doors 22 and 23 in the closed position in which they are held on to the projections 25, 26 (Figure 2) the abutting surfaces being correspondingly cut at an incline, the abutment being so tight that it is not possible to see into the closed space as is also the case with all the other joints.

A motor (electric motor), not shown on the drawing, is mounted in the wooden support 21, the said motor driving by means of an intermediate gear a vertical shaft 33 which projects from the support into the space enclosed by the frame 1 and which operates the driving mechanism of all the movable parts of the temple as well as of the temple itself. The opening and closing operations of the two front doors from the main shaft above referred to will now be described with reference to Figures 2, 3, 6 and 7.

Two driving discs or cams 34, 35 are secured to the driving shaft 33, by any suitable means, in a position which will be hereinafter more particularly described. Underneath the disc 34 there is arranged a lever 36 and underneath the disc 35 a lever 37, each one of these levers surrounding the shaft 33 by means of a guiding slot 38 and 39 respectively. The lever 36 is pivotally connected at the one end to the lower part of the front door 22 by means of a pin 40 and the lever 37 is similarly pivotally connected to the front door 23 by means of a pin 41. The lever 36 is provided on its upper surface with a pin 42 on which a roller 43 is mounted, whilst the lever 37 is provided on its upper surface with a pin 44 on which is mounted a roller 45. The roller 43 is so arranged that it can be engaged by the disc 34 and be forced outwards and similarly the roller 45 can be operated by the disc 35.

When the front doors are in the closed position they and the levers 36 and 37 associated therewith assume the position indicated in Figure 2. The doors are opened as soon as the two discs or cams 34, 35 have been rotated by the shaft 33 to such an extent, in the direction of the arrow indicated in Figure 7, that the front edges 46 and 47 respectively of the two cams come into contact with the rollers and force the latter outwards until the rollers and the levers 36 and 37 assume the outermost position indicated in Figure 7. The rollers and the levers are maintained in this position until the circular parts 48 and 49 of the two respective cams have completed their movement along the rollers so that the latter, together with the levers, can return again into the original position shown in Figure 2.

As the two levers 36 and 37 are connected with the front doors 22 and 23 by a pin connection 40 and 41 respectively they are forced by the front doors into the original position shown in Figure 2 corresponding to the closed doors, this being effected through the intermediary of the helical springs 31 and 32 respectively. Preferably a certain distance is left between the rollers and the driving cams 34, 35 in the position corresponding to the closed doors in order that the latter should always tightly fit at the joints.

As the front doors open and close simultaneously the cams 34, 35 can be constructed so as to be exactly similar to one another. They are angularly displaced on the shaft 33 in such a manner that the cam surfaces 46, 47 and the circular surfaces 48, 49 engage simultaneously with the respective rollers 43 and 45. The dimensions of the circular surfaces 48 and 49 will hereinafter be discussed in more detail.

As stated above, the background or back door 24 has to remain closed when the front doors 22, 23 are first opened since the advertised article or the like is intended to appear in the space in front of the said background, whilst, when the front doors 22, 23 are subsequently reopened the space has to be first emptied and the background closed and in addition thereto the background has to be turned backwards in order to show that there is nothing behind it so that the observer can freely see completely through between the columns.

As with the operation of the front doors 22, 23 by means of the main shaft 33 in the arrangement just referred to the front doors remain each time opened for a long period during a complete revolution of the main shaft and they are closed during the remainder of the revolution, it follows that so far as the operation of the back door is concerned, the latter has not to be opened during each revolution of the main shaft 33 but only with each second revolution thereof and that the opening of the back door during the second revolution shall take place a certain time after the opening of the front doors and that, as regards the closing of the back door the same should take place a certain time before the closing of the front doors.

It has been found that this succession of operations is especially effective. It is however to be understood that the front doors and the back door may be opened and closed simultaneously.

In this case the construction of the drive for the operation of the back door 24 is as follows: On the pin or pivot 27 there is loosely and pivotally mounted a link 50 which is articulated to a bar 51 surrounding the main shaft 33 with a guiding slot 52. A tension spring 53 is attached to the link 50. On the lever 51 there is provided a pin 54 on which is placed a roller 55 and also a further pin 56, the operation of which will be hereinafter described. On the main shaft 33 there is secured over the rod or bar 51 a driving disc 57 having the form shown in Figure 7. The roller 55 engages with the periphery of the said disc under the action of the tension spring 53. As will be seen from the drawing the disc is provided with an outermost periphery 58 which is smaller than that of the discs 43 and 35 at 48 and 49 respectively.

Moreover, the disc 57 is secured on the main shaft 33 in such a manner that it forces the roller 55 and thereby the lever 51 outwardly later than the rollers 43 and 45 are outwardly forced by the respective discs 34 and 35; it will also be seen that owing to the fact that the outer periphery 58 is much smaller than the corresponding peripheries of the discs 34 and 35, the roller 55 will reach its starting position earlier than the driving rollers of the front doors. As the driving disc 57 keeps the back door open as long as the peripheral part 58 is in engagement with the roller 55, this fact determines directly the retarded subsequent opening of the back door and the earlier closing of the latter with respect to the same movements of the two front doors.

I will now describe the means by which the opening and closing movement of the back door is derived from the movable lever 51 hereinbefore described only with each second revolution of the main shaft 33; this is effected by this that the back door is connected or coupled with the bar 51 only during each second revolution of the main shaft.

The coupling means consist of the pin 56 provided on the bar 51 and a reciprocating bolt 59 provided in the lower part of the frame of the door 24 (Figs. 3, 4 and 5). When the bolt 59 is in its furthermost left hand position (with respect to the drawings) it surrounds with its slotted end 60 the pin 56 whilst when it is in its furthermost right hand position illustrated on the drawings, it releases the pin 56. The roller 55 is secured to the bar 51 in such a manner that in the position of rest shown in Fig. 7 the pin 56 is exactly in front of the slot 60 as is indicated in Fig. 6. It is only when the driving disc 57 forces the roller 55 outwardly that also the pin 56 is moved outwardly. Consequently when the back door 24 is in its closed position the pin 56 will always be released by a displacement of the bolt 59 to the right hand side, and the coupling will be effected by a displacement to the left hand side and there is plenty of time at one's disposal in order to effect the coupling and uncoupling which will now be described.

In the lower part of the door frame 24 there is mounted a vertical axle 61 which is connected at its lower end with a member consisting of a projection 62 and a toothed wheel 63 arranged below it (Figs. 3, 4 and 5). The projection 62 lies within a suitably wide slot in the bolt 59; if the bolt 59 is made in two parts, the parts lying on the right and left hand sides of the projection 62 are connected together by a stirrup 64. When the toothed wheel 63 is rotated, the projection 62 displaces the bolt 59 alternately to the right and to the left hand side as is necessary for the coupling and uncoupling movement, as already described above. On the other hand however, the bolt 59 must lie on the right hand side during one revolution of the main shaft 33 if the back door is to remain closed and during the subsequent revolution it must lie on the left hand side if now the back door 24 is also to be opened. It follows therefore that also the projection 62 must perform only one half revolution during one complete revolution of the main shaft 33, and thus its operation must be derived from the main shaft with a gear ratio of 1:2.

In this form of construction according to the present invention, for other reasons which will be explained hereinafter, I do not provide an ordinary toothed gear for the movement of the projection 62 but an intermittently operating toothed wheel and toothed bar drive of special construction.

Figure 7:
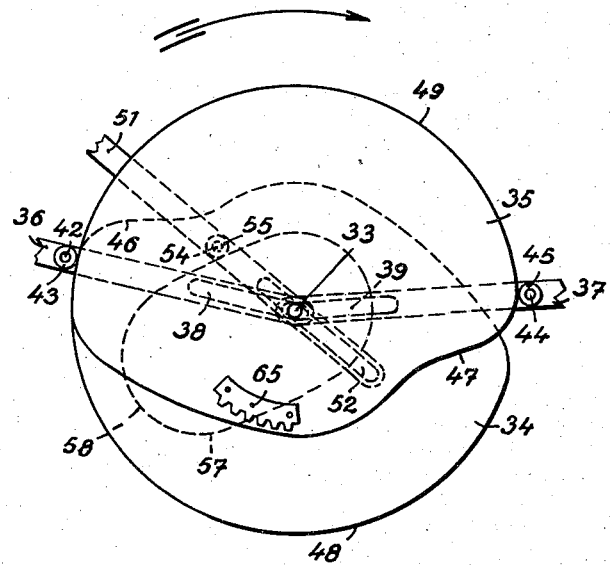
Figure 7 is a plan view of the noncircular driving discs that are employed and a portion of the levers operating therewith.

Referring to Figs. 6 and 7 a toothed bar 65 is provided on the uppermost driving disc 35. The teeth of the said bar come into engagement with the toothed wheel 63 for a predetermined position of the disc 35 during one revolution of the latter and consequently of the main shaft 33. This position is so chosen that the engagement takes place and the operation of the toothed wheel 63 is completed before one of the discs 34, 35 comes into engagement with the rollers 43 and 45 respectively thereby effecting the opening of the two front doors. Thus the rotation of the toothed wheel 63 around its axis always takes place whilst the front doors are closed. Moreover the toothed bar 65 is so arranged that the engagement with the toothed wheel 63 takes place each time the roller 55 has already left the portion 58 of the disc 57, and is thus in its original position so that the bolt 59 is always engaged by or released from the slot 60 in the position of rest when the back door 24 is closed.

If the number of teeth of the toothed segment 65 is chosen so as to have the same ratio to the number of teeth of the wheel 63 as above indicated, it will be seen that each time these two members engage with one another the toothed wheel will be turned only through an angle of 180° and therefore the projection 62 will be moved from the position shown in Fig. 5 to the exactly opposite position and the next time it will be returned to the original position shown in Fig. 5. Each rotation through an angle of only 180° of the toothed wheel 63, projection 62 and finally—as will be hereinafter pointed out—of the axle 61 is thus associated with a full and complete revolution of the main shaft 33. Consequently during such a revolution a coupling takes place between the back door and the pin 56, the door being thus opened, whilst during the next revolution the pin 56 moves alone outwardly, without taking along the back door 24 so that the latter remains closed.

Now in order to ensure that the back door shall remain closed in view of certain further operations which will hereinafter be described, special locking means are provided therefor. One of the lockings is effected by means of the bolt 59. The reciprocating bolt 59 hereinbefore described is provided for this purpose at its right hand end (Figs. 4 and 5) with a slot 66 which when moved into the right hand position engages with a projection 67 which is suitably secured within the frame 1, whilst it is freed therefrom when it is moved into its left hand position. This ensures that the back door 24 cannot be opened in the first case whilst it is released in the second case.

The reciprocating movement of the bolt 59 is effected by the toothed wheel 63 which is in engagement with the toothed segment 65. If the bolt 59 is in its locking position on the right hand side and now the toothed segment 65 comes into engagement with the toothed wheel 63, the projection 62 is moved out of the position illustrated in Fig. 5 whereby the bolt 59 is in the first instance released, and is then moved into the opposite position on the left by the approach of the projection. In this case certain friction resistances have to be overcome so that a certain pressure is exerted in the teeth which are in engagement with one another, which pressure tends to move the wheel 63 out of engagement with the toothed segment 65. Consequently at the moment the door 24 is unbolted the said tooth pressure could move outwardly the door itself, although this movement may be a small one. Similarly when the toothed wheel 63 is returned to its original position illustrated on the drawing, that is to say when the toothed segment comes into engagement with the toothed wheel 63 during the subsequent rotation of the main shaft 33 the same outwardly directed tooth pressure may arise and the door 24 be moved outwardly whereby the toothed segment and toothed wheel are uncoupled and the latter is not further taken along. For this reason a second locking is provided which comes more particularly into operation when the bolt 59 has been moved out of its locking position shown in Fig. 5. This second locking means is shown in Figs. 2, 3 and 5. It comprises a lever 69 with projection 70 pivotally mounted at 68 in the frame 1. The lever 69 lies between the roller 45 and an abutment 71 on the lever 37. When the roller 45 is moved outwardly in the manner hereinbefore described it takes along with it the lever 69 thereby displacing the projection 70 from the track of the door 24. When the roller 45 together with the lever 37 returns into the initial position the projection 71 takes along with it the lever 69 and moves the projection again into the path of the door 24. It will thus be seen that the projection 70 will always release the door 24 when the front door 23 is open and it will lock it when the front door is closed. Consequently the back door can be moved towards the back during each second revolution in the manner hereinbefore described since this has to take place only when the front doors are also open, whilst when the front doors are closed any returning movement of the back door as a whole is prevented. However the toothed segment 65 comes into engagement with the toothed wheel 63 only when the front doors are closed as above described, so that an outwardly directed tooth pressure occurring owing to the last described locking can never open the door 24 and disengage the toothed segment from the toothed wheel. However the locking first described by means of the bolt 59 causes the back door 24 to be locked in its closed position when the front doors are open and the back door is not to be opened since the pin 56 is not in engagement with the bolt 59 when the bolt 69 is in the said locking position.

I will now describe how the article to be advertised or the like is moved into the space in front of the background and is removed therefrom.

For this purpose a suitable part of the back door is made so as to be capable of rotating around its vertical axis of symmetry; it is to be pointed out that this rotatable part may be made of any size and of any form and more particularly it may be made so large that the door 24 may be left only with a frame which need not even be closed but consists of an upper and lower supporting arm for the vertical axle of the part 72. Whilst the part 72 is loosely and rotatably mounted at the upper part in the back door by means of a pivot it is secured at the lower end to the axle 61, of which it has been stated above, that it performs only half a revolution during a complete revolution of the main driving shaft 33 and this only when the front doors are closed; thus also the part 72 is rotated through an angle of 180° around a vertical axis of symmetry after each closure of the front doors and whilst the latter are kept closed.

The front and rear sides of the part 72 are made entirely identical. Moreover, the transition of the part 72 into the door 24 cannot be seen by the observer when the part 72 is in its position of rest. In this way the observer will never be able to see, when the front doors are open, whether the front or rear sides of the part 72 are in the door 24; in any case he will not even know that such a movable part has been provided in the back door.

If a platform 73 is provided on the part 72 on one side thereof any desired object to be advertised may be placed thereon and similarly the object to be advertised or the like may be connected in an invisible manner with the part 72. The object will first be visible in the interior of the space and then it will be moved, thus being rendered invisible to the observer. In the latter case when the object is on the outside and is hidden from the observer by the temple it may be replaced by another object from behind.

Figure 8:
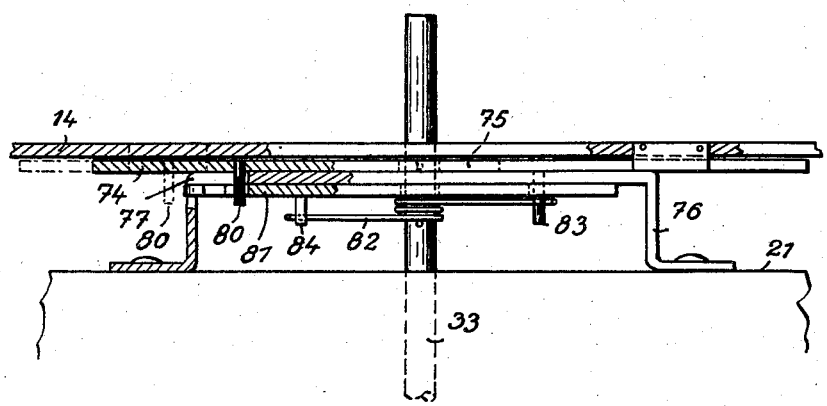
Figure 8 shows in elevation and part sectional elevation the connection between the bottom plate of the temple and the support together with the driving shaft for the intermittent rotation of the temple around its axis.

I will now describe the last part of the drive, viz, the means by which the temple is rotated once around its vertical axis when the front doors are closed and the back door is also closed, whilst the object to be advertised or the like is in the closed space of the temple. This movement is also derived from the main driving shaft 33 and will now be described with reference to Figures 8 and 9.

A slide 74 is mounted on the part 14 below it and is covered by the frame 1, the said slide being capable of being displaced backwards and forwards in the direction of a diameter of the part 14, a slot 75 being provided therein, through which slot passes the main shaft 33. A stirrup 76 is secured to the support 21, the main shaft 33 loosely passing through it. A recess 77 is provided on one end of the said stirrup, the said recess merging into a guiding surface 78; a guiding sheet of iron is provided opposite the said recess. A pin 80 is secured to the slide 74, the said pin being capable of passing in the direction of the arrow into the recess 77, moving along radially outwards and then sliding along the surface 78. Underneath the stirrup 76 a kind of catch 81 is provided on the said stirrup, in such a manner that the main shaft 33 passes through a hole in the catch, this serving as a rotating axle for the latter, a helical spring or the like 82 being provided around the shaft 33 and abutting with one on a pin 83 which is secured in the stirrup 76 whilst its other end engages the pin 84 which is secured to the lower surface of the catch 81. The catch is also provided with two grooves 85, 86. Moreover two teeth 87, 88 are provided in the slot 75 and a feeding projection 89, movable in the slot 75 is provided on the main shaft 33.

Figure 9:
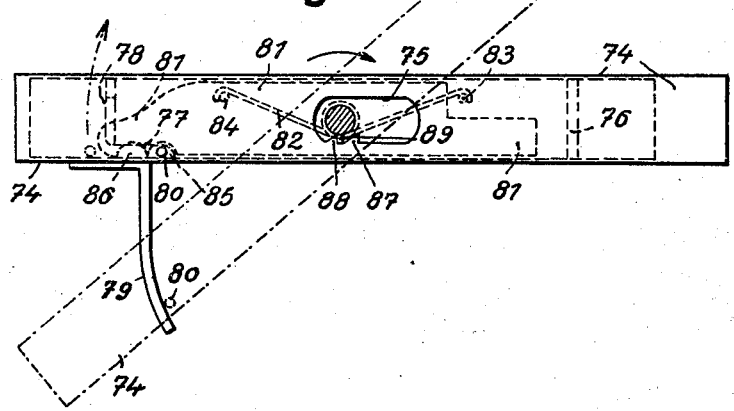
Figure 9 shows a plan view partly in section of the parts of the connection shown in Fig. 8, connected with the support.

Let us assume that the slide 74 has the position shown in Figure 9 and that the main shaft 33 abuts against the first tooth 88 with its feeding projection 89; in that case the pin 80 lies inside the groove 85 at the inner end of the recess 77.

When the main shaft 33 moves in the direction of the arrow indicated in Figure 9 the slide 74 is moved to the left by the projection 89 to the extent of the width of one tooth. In this case the pin 80, provided on the slide 74, passes from the groove 85 into the groove 86 whilst pressing back the catch 81 against the action of the spring 82 being, however, stopped in the groove 86 by the catch. When the main shaft has performed a complete revolution it engages the tooth 87 and pushes the slide 74 to the left to the extent of the width of another tooth. The pin 80 thereby leaves the groove 86 in front of the guiding surface 78 and the slide 74 together with the bottom part 14 and thus the whole of the temple can now rotate once around the geometrical axis of the main shaft 33. If the slide 74 reaches the position shown in Figure 9 before the completion of this revolution the pin 80 is engaged by a bent part of the guide 79 and guided again into the inlet opening of the recess 77 and into the groove 85. This movement effects at the same time that the slide 74 is moved relatively to the bottom part 13 and main shaft 33 into the starting position. The one revolution of the slide 74 and thus of the temple is completed as soon as the pin 80 engages again in the recess 77. The feeding projection 89 is secured to the shaft 33 in such a manner that at the moment the pin enters into the recess 77, it does not lie on the right hand side of the tooth 88, as shown in Figure 9, but on its left as near as possible to the left hand inclined side of the said tooth. Consequently the main shaft 33 will have to perform an almost complete revolution until the projection 89 reaches the tooth 88 in the position shown in Figure 9 and thereby displaces the slide to the left to the extent of the width of one tooth; the main shaft will have to perform a further complete revolution until the tooth 87 is displaced to the left and the remainder of the movement of the projection 89 and main shaft 33 during which the pin 80 is finally removed from the groove 86 and is released at the guiding surface 78 is such that there are two complete revolutions of the main shaft 33 between the first stop of the pin 80 in the recess 77 and release of the pin on the guiding surface 78; thus during these two revolutions a rotation of the temple relatively to its support is prevented.

The main shaft 33 has to effect the movement of the door through the intermediary of the various cams by overcoming the counter-forces caused by the springs 31 and 32 which tend always to keep the front doors in a closed position and by the spring 53 as well as by a further spring which may have to be provided in order to keep also the back door in the closed position. However the bottom plate of the temple is supported by the support through the intermediary of rollers. Consequently the resistance which has to be overcome during the rotation of the temple around its vertical axis is substantially smaller than the resistance which is offered to the operation of the cams. Therefore when the plate 14 is held opposite the support 21 by the pin 80 in the manner hereinbefore described the continuously operated main shaft 33 will rotate the cams relatively to the bottom plate 1 and the plate 14 and effect the hereinbefore described movement of the various doors. However as soon as the locking of the plate 14 with respect to the support 21 is removed after two complete revolutions of the main shaft, according to the law of the smallest resistance, a movement of the cams relatively to the temple will no longer take place, but the latter will revolve once completely around its axis, whereupon the pin 80 will be stopped again and the sequence of operations will be repeated.

I will now describe the complete operation of the advertising device constructed according to the present invention:—

Let us assume that the pin 80 has just entered into the recess 79 and thus brought the temple to rest. All the doors are closed, and the front doors face the observer and the article to be advertised is in the interior of the closed temple.

The main shaft 33 which continues to rotate brings the cams 34 and 35 with the controlling surfaces 46, 47 simultaneously in contact with the rollers 43 and 45 and drive the latter outwardly whereby the levers 36, 37 are taken along and the front doors 22, 23 are opened, the latter remaining open as long as the rollers 43 and 45 are in engagement with the controlling surfaces 48 and 49 respectively. The back door is closed and is locked in the right hand position by the bolt 59. The part 72 of the back door is so arranged in the same that the article to be advertised or the like is in front of it and is thus seen by the observer. A certain time after the opening of the front doors also the pin 56 is moved outwardly by the disc 57 without however being coupled with the back door; the movement which it performs is therefore an idle one, the pin thereupon returning into its initial position.

After a certain time the rollers 43 and 45 leave the controlling surfaces 48 and 49 and the front doors are simultaneously closed. They remain closed during the further rotation of the main shaft 33 during which rotation the toothed segment 65 comes into engagement with the toothed wheel 63 and rotates the latter through an angle of 180°. This causes the bolt 59 to be displaced to the left releasing the back door and coupling the same with the pin 56. Moreover the part 72 is rotated through an angle of 180° whereby the article to be advertised or the like is conveyed from the interior of the space to the outside behind the back door. However the back door is still securely locked by the projection 70. Now whilst the front doors are still closed, the projection 89 comes into engagement with the first tooth 88 and displaces the slide 74 to the left to the extent of the width of one tooth. Now starts the second revolution of the main shaft 33 whereby first of all the front doors 22 and 23 are opened as already described and the empty space of the temple is revealed to the surprised observer. Shortly after the roller 55 and with it the lever 51 are pressed outwardly by the cam 57 the back door 24 now being moved along since the pin 56 is coupled therewith. The observer can now see also through the rear side of the temple. The article to be advertised is then in the space which is completely hidden from the observer by the door 24 which has been moved to the back and the front door 22 which has been turned to the side; for this reason the back door 24 and front door 22 are made capable of turning around the same roller or axis 5. Now the roller 55 leaves the controlling surface 58 and the back door is again closed being positively pulled back by the pin 56 or spring 53 and if desired also by a further spring acting directly thereon. Thereupon also the rollers 43 and 45 leave the controlling surfaces 48 and 49 respectively and the front doors are closed. The toothed segment 65 now comes again in engagement with the toothed wheel 63 and displaces the bolt 59 again to the right whereby the back door is additionally locked since the projection 70 has again been brought into its locking position by the return of the front door 22 or lever 37 into their initial positions.

At the same time also the part 72 is rotated through an angle of 180° so that the article to be advertised (and which in the meantime may have been replaced by another one) which is thereon is conveyed into the interior of the closed space of the temple. Now the projection 89 is moved along the second tooth 87 in the slide 74 and displaces the latter to the left to the extent of the width of one tooth whereby the pin 80 is moved out of the recess 77 and comes to lie in front of the guiding surface 78. The completely closed temple which contains the article to be advertised is now rotated around its vertical axis through one complete revolution, the pin 80 runs again through the positive guide 79 into the inner end of the recess 77 and the sequence of operations is repeated.

I have already pointed out above that any visible joints in the back door are to be avoided as well as any possibility of seeing through the joints of the front doors; in addition thereto all the linings of the doors and of the bottom plate must be such that the observer cannot see any parts of the driving mechanisms. For this purpose the floor 11 mentioned above may be provided (see Fig. 6) which floor also shields the lower part of the back door with the toothed wheel from the observer. Of course also the toothed wheel 63 with the parts associated therewith is made so small or the thickness of the doors is made such that no visible projections or the like are formed; if necessary also the front doors must be provided with such projections or the like in order that all the doors shall be of exactly the same construction. If it is not possible to cover the toothed wheel 63 by means of a floor 11 with respect to the observer whilst the back door is open a flap may be provided over the opening in the back door behind which lies the toothed wheel 63 and the said flap may be positively closed when the back door is turned outwards and be again opened when turned back at the last moment before the closing of the door; there is no difficulty in deriving the movement of the said flap from the rotary movement of the door.

It is to be understood that the invention is not limited to the form of construction hereinbefore given by way of example and that the invention may be carried into effect in any other suitable way. Thus for instance instead of doors other covering means may be used for the required opening, such as for instance curtains or the like. Further the back door 24 may be provided below the part 73 with a fixed part 90 corresponding exactly to the part 73 (Figs. 3 and 4). When the article to be advertised is in the space the parts 73 and 90 register with one another; when the part 73 is outside the frame the part 90 remains in the latter on the door 24 and the observer apparently sees the empty supporting part 73, in reality however only the part 90. His surprise is thereby increased. On the other hand however it is ensured that the toothed wheel 63 will be shielded from the observer also when the door is turned down at the back.

What I claim is:—

1. An advertising device, a chamber, front and rear doors for said chamber, said rear door forming a background to support articles for display, power operated means for opening said front door at definite intervals of time and for rotating said chamber on a vertical axis when the doors of said chamber are closed.

2. An advertising device, a chamber, front and rear doors for said chamber, said rear door forming a background to support articles for display, power operated means for opening the said front door and for moving the background and springs for forcing the said front door and movable background into closed positions, the said power operated means being capable of operating said doors against the force of said springs.

3. In an advertising device as claimed in claim 1 in which the power operated means comprises a motor driven shaft, cams mounted on said shaft, links connected to said doors, rollers on said links to be engaged by said cams.

4. In an advertising device as claimed in claim 2 in which the power operated means comprises a motor driven shaft, cams mounted on said shaft, links connected to said doors, rollers on said links to be engaged by said cams.

5. An advertising device comprising a chamber, front and rear doors for said chamber, said rear doors forming a background to support articles to be displayed, a movable section formed in said background, means for opening and closing the front door at definite intervals of time, means for moving said background when said front doors are open or being opened and means for moving the movable part of the background when said front doors are closed.

6. An advertising device comprising a chamber, front and rear doors for said chamber, said rear door forming a background for articles to be displayed, means for opening said front door for definite intervals of time and for opening said back door when said front door is closed.

7. An advertising device comprising a chamber, front and rear doors for said chamber, said rear door forming a backgound for articles to be displayed, a movable section formed in said background, means for opening and closing the front door at definite intervals of time, and for moving said background, said means comprising a power driven shaft, cams mounted on said shaft, links connected to said doors, rollers on said links engaged by said cams, and a toothed gear drive comprising two toothed members, one connected to said movable part of the background and the other to the bottom of the chamber, said gears being coupled together when the background is closed and uncoupled when the background is in open position.

8. An advertising device comprising a chamber, front and rear doors for said chamber, said rear door forming a background for articles to be displayed, a movable section formed in said background, means for moving said doors to open position, said means being releasably connected to said rear door and means for releasing said moving means for the rear door for definite periods of time.

9. An advertising device as claimed in claim 8 and in combination therewith of means for turning over the movable part of the background when the front door is closed, the said means including a toothed gear, a rack operably connected with the gear, and an element on which the rack is mounted and forming a part of the moving means which effects the displacement of the movable part of the movable background and also the coupling of the movable background with and its uncoupling from the moving means, as set forth.

10. An advertising device as claimed in claim 8 and in combination therewith of means for moving the background, the said moving means comprising a main shaft, cams on said shaft, levers secured to the doors, rollers on the said levers engaged by said cams, and a toothed gear drive operated by said moving means and a bolt for locking the movable background in its closed position, the said toothed gear operating the movable part of the background and also the said bolt, as set forth.

11. An advertising device as claimed in claim 8 and having a driving member for the background, a plate fixed to the background and covering the said driving member, and a supporting plate secured to the movable part of the background and capable of registering completely with the said part fixed to the background, as set forth.

In testimony whereof I have signed my name to this specification.

ALEXANDER TRIPPE-FÜRST.